(12) United States Patent
Van Putte et al.

(10) Patent No.: US 12,385,813 B2
(45) Date of Patent: Aug. 12, 2025

(54) ELECTRON MICROSCOPY GRIDS AND HIGH-RESOLUTION STRUCTURAL DETERMINATION METHODS

(71) Applicants: UNIVERSITEIT GENT, Ghent (BE); UNIVERSITEIT ANTWERPEN, Antwerp (BE); IMEC VZW, Leuven (BE)

(72) Inventors: Wouter Van Putte, Diksmuide (BE); Thomas Reichert, Ostend (BE); Jean-Pierre Timmermans, Mol (BE)

(73) Assignees: UNIVERSITEIT GENT, Ghent (BE); UNIVERSITEIT ANTWERPEN, Antwerp (BE); IMEC VZW, Leuven (BE)

( * ) Notice: Subject to any disclaimer, the term of this patent is extended or adjusted under 35 U.S.C. 154(b) by 397 days.

(21) Appl. No.: 18/017,876

(22) PCT Filed: Aug. 20, 2021

(86) PCT No.: PCT/EP2021/073102
§ 371 (c)(1),
(2) Date: Jan. 25, 2023

(87) PCT Pub. No.: WO2022/038251
PCT Pub. Date: Feb. 24, 2022

(65) Prior Publication Data
US 2023/0288299 A1    Sep. 14, 2023

(30) Foreign Application Priority Data
Aug. 21, 2020    (EP) ..................................... 20192216

(51) Int. Cl.
*G01N 1/28*    (2006.01)
*G01N 1/42*    (2006.01)
*G01N 23/2204*    (2018.01)

(52) U.S. Cl.
CPC .............. *G01N 1/2813* (2013.01); *G01N 1/42* (2013.01); *G01N 23/2204* (2013.01); *G01N 2001/2826* (2013.01); *G01N 2223/418* (2013.01)

(58) Field of Classification Search
CPC .... G01N 1/2813; G01N 1/42; G01N 23/2204; G01N 2001/2826; G01N 2223/418; H01J 2237/20

(Continued)

(56) References Cited

U.S. PATENT DOCUMENTS

2007/0134699 A1* 6/2007 Glover ................. B01J 19/0046
977/924
2013/0277573 A1 10/2013 Miller et al.
(Continued)

FOREIGN PATENT DOCUMENTS

WO    2012/094634 A2    7/2012
WO    2016/120450 A1    8/2016
(Continued)

OTHER PUBLICATIONS

International Search Report and Written Opinion mailed on Dec. 6, 2021 issued in PCT International Patent Application No. PCT/EP2021/073102.
(Continued)

*Primary Examiner* — Laura Martin
*Assistant Examiner* — Anthony M Megna Fuentes
(74) *Attorney, Agent, or Firm* — Amster, Rothstein & Ebenstein LLP

(57) ABSTRACT

The invention provides in an electron microscopy grid, comprising: a perforated substrate; a support film on the perforated substrate; a mixture of different linker molecules according to Structure (I), wherein AG is an anchoring group, for anchoring the linker molecule to the solid support;
(Continued)

BU is a binding unit, for binding to the analyte; L1 is a first linear linker section; $L_2$ is a second linear linker section; α is the angle between the linear linker section $L_1$ and the linear linker section $L_2$; AS is an angled linker section, connecting the linear linker section $L_1$ and the linear linker section $L_2$. The invention further provides in method of structural determination of analytes, using such EM-grids.

14 Claims, 2 Drawing Sheets

Specification includes a Sequence Listing.

(58) Field of Classification Search
USPC ........................................... 73/864.91
See application file for complete search history.

(56) References Cited

U.S. PATENT DOCUMENTS

| | | |
|---|---|---|
| 2016/0067738 A1 | 3/2016 | Miller et al. |
| 2018/0017558 A1 | 1/2018 | Terfort et al. |
| 2022/0157559 A1 | 5/2022 | Van Putte et al. |

FOREIGN PATENT DOCUMENTS

| | | | |
|---|---|---|---|
| WO | WO-2020041202 A1 * | 2/2020 | ........... C01B 32/198 |
| WO | 2020/173952 A1 | 9/2020 | |

OTHER PUBLICATIONS

Norihito Shibata et al., "Development of Protein Degradation Inducers of Androgen Receptor by Conjugation of Androgen Receptor Ligands and Inhibitor of Apoptosis Protein Ligands", Journal of Medicinal Chemistry, vol. 61, No. 2, 2017, pp. 543-575, XP055501434, https://doi.org/10.1021/acs.jmedchem.7b00168.

Llorente V. R. Boñaga et al., "Synthesis of Macrocycles via Cobalt-Mediated [2 + 2 + 2] Cycloadditions", Journal of the American Chemical Society, vol. 127, No. 10, 2005, pp. 3473-3485, XP055769509, https://doi.org/10.1021/ia045001w.

Mikaela Gustafsson et al., "Crystal formation and size control of zeolitic imidazolate frameworks with mixed imidazolate inkers", Journal of Porous Materials, vol. 20, No. 1, 2012, pp. 55-63, XP035156153, DOI: 10.1007/s10934-012-9574-1.

V. Nicholas Vukotic et al., "Mechanically Interlocked Linkers inside Metal-Organic Frameworks: Effect of Ring Size on Rotational Dynamics", Journal of the American Chemical Society, vol. 137, No. 30, 2015, pp. 9643-9651, XP055769508, https://doi.org/10.1021/jacs.5b04674.

* cited by examiner

ELECTRON MICROSCOPY GRIDS AND HIGH-RESOLUTION STRUCTURAL DETERMINATION METHODS

CROSS-REFERENCE TO RELATED APPLICATIONS

This application is a U.S. national stage entry under 35 U.S.C. § 371 of PCT International Patent Application No. PCT/EP2021/073102, filed Aug. 20, 2021, which claims priority to European Patent Application No. 20192216.8, filed Aug. 21, 2020, the contents of each of which are incorporated herein by reference in their entirety.

FIELD OF THE INVENTION

The present invention is in the field of electron microscopy (EM), more particularly cryo-electron microscopy (cryo-EM). The invention provides grids and affinity grids for electron microscopy. The invention allows for structural determination of analytes, which can be bound to said grids.

BACKGROUND OF THE INVENTION

Recent developments in the field of electron microscopy and cryo-electron microscopy, allow for structural analysis or structural determination of analytes, such as biomolecules. Compared to X-ray crystallography, which is currently used for structural determination of analytes, no crystals need to be grown of the analyte when using EM and cryo-EM.

To obtain a high-resolution structure of the analyte using EM or cryo-EM, a large number of images of the analyte is needed in different orientations. It has been observed that the analytes on a grid have a tendency to orient in a preferred orientation or a similar orientation. A common approach to resolve this is to add additives, such as mild detergents to the buffer in which the analyte resides, to re-orientate the analyte. The outcome of this procedure is however unpredictable and it can be that even after testing different additives the orientation of the analyte is still not optimal. Another option that has been used is to add biomolecules such as antigen-binding fragments (Fab), single-domain antibody fragments or darpins to change the orientation. The disadvantage of such an approach is that target-specific biomolecules should be available, which is not always the case. Furthermore, similar as the first approach, there is still no guarantee that an optimal particle orientation can be obtained. A third option is the use of cryo-EM grids whereby an additional continuous film is added to the cryo-EM grid such as graphene. This can lead to improvements, but again is not certain. Other options have also been defined, but in the end one can conclude that problems related to analyte orientation requires a tedious process of screening of multiple conditions and approaches without certainty of a positive outcome.

One approach to increase the resolution was to use an affinity grid whereby the linker has a flexible spacer between the grid and the analyte. It was thought that the spacers and especially adapting their length could increase the flexibility and hence the variability of the angular distribution of a specific analyte. It has been found, however that even when very long linkers are being used, on the grid, the analytes will still tend to orient in a similar way and hence does not prevent preferred orientation.

The lack of sufficient angular distribution in analytes on the grid results in a lack of different projection angles of the analyte that can be used when reconstructing 2D projections into a 3D volume. Consequently, a large amount of scans are needed to obtain a high resolution structure of the analyte. In an effort to make the structure determination process using EM or cryo-EM more efficient and cheaper, the orientation of the grid might be adjusted between images (i.e. tilted images). However, this solution is suboptimal as the angle is limited as the focus plane of the different particles at different positions will also change, reducing contrast of off-axis particles and hence reduction in image quality. This means that the number of images needs to be increased to increase the number of good quality analyte particles. Furthermore, the maximal usable angle that can be varied is still limited, especially for smaller analytes, and therefore always leads to missing angular information.

Hence, there remains a need for efficient methods for structure determination using EM or cryo-EM at high resolution. There remains a need for efficient methods for structure determination using EM or cryo-EM that can cover all analytes and or proteins, even those that in normal conditions lead to preferred orientations. There remains a need for grids which may reduce the number of images needed to obtain a high-resolution structure of the analyte. Preferably, the method and/or grid does not require changes to existing electron microscopes. Preferably, the method and/or grid ensure an even distribution of the analyte over the surface of the grid and/or the perforated substrate, hence no spots on the grid which are too crowded with analyte or too diluted. Preferably, the method and/or grid avoids adherence of the analyte directly to the surface of the grid. Preferably, the method and/or grid allow for reproducible structural analysis of the same analyte. Preferably, the method and/or grid allow for reproducible structural analysis of the same analyte in complex with different (bio) molecules, preferably without the need of a tedious screening process whereby different conditions need to be tested and/or different grids needs to be screened. Preferably, the method and/or grid allow for high throughput structural analysis. Preferably, the method and/or grid allow easy priming of the grid. Preferably, the method and/or grid limits interference of linkers, spacers, and/or anchoring groups. Preferably, the method and/or grid allow for capturing the analyte from a mixture of molecules. Preferably, the method and/or grid allow to limit the purification steps of the analyte before the analyte is being primed on the grid.

SUMMARY OF THE INVENTION

The present inventors have found an electron microscopy grid, comprising:
- a perforated substrate;
- a support film on the perforated substrate;
- a mixture of linker molecules, wherein said mixture of linker molecules comprises:
  - A. at least a first linker molecule according to Structure (I)

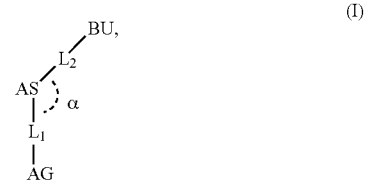

wherein
- AG is an anchoring group, for anchoring the linker molecule to the support film;
- BU is a binding unit, for binding to the analyte;
- $L_1$ is a first linear linker section;
- $L_2$ is a second linear linker section;
- $\alpha$ is the angle between linear linker section $L_1$ and linear linker section $L_2$;
- AS is an angled linker section, connecting linear linker section $L_1$ and linear linker section $L_2$;

and,
B. at least a second linker molecule, wherein the second linker molecule is:
  a. a linker molecule according to structure (I), wherein at least AS, $L_1$, $L_2$ or $\alpha$ is different from the AS, $L_1$, $L_2$ or $\alpha$ of the first linker molecule; or,
  b. a linker molecule according to structure (II):

(II)

wherein
- AG is an anchoring group, for anchoring the linker molecule to the support film;
- BU is a binding unit, for binding to the analyte;
- $L_3$ is a third linear linker section;

wherein the linker molecules are attached to the support film via the anchoring group.

It was found that such grids provide a better angular distribution of the analyte once immobilised on the grid. The first linker molecule and the second linker molecule force the analyte in at least two different orientations instead of the one preferred orientation when just a spacer is used to bind the analyte to the grid. Each linker molecule forces the analyte in an orientation thereby maximizes the angular distribution of the particle, which in turn increasing the number of different projection angles of the analyte and hence improving the resolution. This may drastically reduce the time needed for image acquisitioning. As the angular distribution of the analyte on the grids is maximised, there may be no need to tilt the grids in different angles during image acquisitioning, which may further reduce the time needed for image acquisitioning.

The grids of the invention allow for easy priming of the analyte; as after binding of the analyte, no further steps are needed to increase the angular distribution. There is no need to add further additives or detergents after the analyte has bound to the anchoring groups. This may speed up sample preparation and may make sample preparation more reliable and reproducible. These advantages may allow the grids of the invention to be used in high-throughput screening of analytes, complexes of analytes, epitope mapping, antibody screening and the like.

A further advantage of the grids of the invention is that the linker molecules can be kept fairly short, but still provide a decent angular distribution of the analyte. This may reduce noise in the EM images as long linkers may interfere with the image of the analyte. Hence, the grids may allow for a high signal to noise ratio. Even though the linker molecules can be kept fairly short, they will introduce some distance between the surface of the grid or the support film and the analyte. Hence, the grids prevent interaction between the analyte and the surface of the grid or support film.

In some embodiments, the electron microscopy grid is an affinity electron microscopy grid.

In some embodiments, the angled linker section comprises a double bound, a ring structure, or an aromatic structure.

In some embodiments, $L_1$, $L_2$ and $L_3$ are independently an alkyl chain, a polyester, a polyether, a polyalcohol, a polyglycol, a poly (N-isopropylacrylamide) (PNIPAM), a polyacrylamide (PAM), a poly (acrylic acid), a polymethacrylate, an acrylic polymer, a PEG, a polypeptide, DNA, RNA, peptide nucleic acid (PNA) or an other DNA mimic.

In some embodiments, $L_1$, $L_2$ and $L_3$ are independently $-(-CH_2-CH_2-O-)_n-$, $-(-CH_2-CH_2-NH-)_n-$, $-(-CH_2-)_n-$, a polypeptide comprising n amino acids; wherein n is an integer of at least 1, preferably in n an integer larger than 1.

In some embodiments, n is at least 1 to at most 15, preferably at least 1 to at most 13, preferably at least 1 to at most 10, preferably at least 1 to at most 5, preferably at least 1 to at most 3, preferably at least 1 to at most 2.

In some embodiments, the mixture of linker molecules comprises at least two linker molecules according to structure (I) of which the angle ($\alpha$) for each of said at least two linker molecules differs at least 10°, preferably at least 20°, preferably at least 30°, preferably at least 60°, preferably at least 90°, preferably at least 120°, preferably at least 150°, preferably at least 180°.

The invention provides a method for forming an electron microscopy grid, preferably according to an embodiment described herein, comprising the steps of:
- providing a perforated substrate;
- providing a support film on the perforated substrate;
- attaching first linker molecules according to Structure (I) to the support film via the anchoring group;
- partially modifying the linker molecules attached to the support film to second linker molecules according to Structure (I) attached to the support film; such that at least AS, $L_1$, $L_2$ or $\alpha$ of the second linker molecules is different from the AS, $L_1$, $L_2$ or $\alpha$ of the first linker molecule;
- wherein the modifying the linker molecules is chemical or physical, preferably by photoisomerization.

The invention provides in a method for immobilizing an analyte to an electron microscopy grid comprising:
A. providing an electron microscopy grid according to an embodiment described herein;
B. contacting the electron microscopy grid with a solution comprising the analyte, thereby immobilizing the analyte on the electron microscopy grid by the formation of a bond between the binding unit and the analyte;
C. optionally, partially or fully removing the solution from the electron microscopy grid.

The invention provides in a method for determining the structure of an analyte, comprising:
a) the method for immobilizing the analyte as described herein, providing a primed electron microscopy grid;
b) vitrifying the primed electron microscopy grid obtained in a);
c) acquiring electron microscopy images from the electron microscopy grid obtained in b);
d) reconstructing the structure of the analyte from said electron microscopy images.

The invention provides in a linker molecule suitable for attaching an analyte to a support film or a surface, according to Structure (I), wherein:

AG is an anchoring group, for anchoring the linker molecule to the support film or the surface;
BU is a binding unit, for binding to the analyte;
$L_1$ is a first linear linker section;
$L_2$ is a second linear linker section;
α is the angle between the linear linker section $L_1$ and the linear linker section $L_2$;
AS is an angled linker section, connecting the linear linker section $L_1$ and the linear linker section $L_2$; and,
wherein the anchoring group (AG) is an amine group, a maleimide group, a thiol group, a diazonium group or a carbonyl group.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

Figure 1:
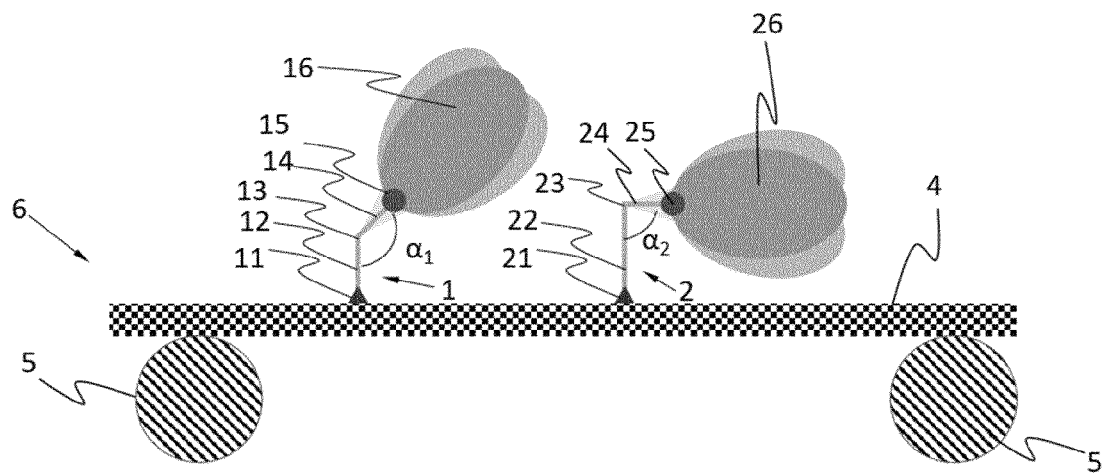
FIG. 1 shows a diagram of an electron microscopy grid according to an embodiment of the invention, wherein the mixture of linker molecules comprises a first linker molecule and a second linker molecule.

Before the present method and products of the invention are described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the context of the present invention, an electron microscopy grid may alternatively be referred to as an electron microscopy sample support. The term "electron microscopy grid" as used herein may be understood as a sample support used in electron microscopy, a support or grid whereon the analyte is presented for image acquisition in electron microscopy.

The invention provides in an electron microscopy grid (EM-grid), comprising:
 a perforated substrate;
 a support film on the perforated substrate;
 a mixture of linker molecules, wherein said mixture of linker molecules comprises:

A. at least a first linker molecule according to Structure (I)

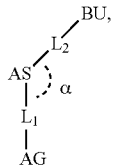

wherein
   AG is an anchoring group, for anchoring the linker molecule to the support film;
   BU is a binding unit, for binding to the analyte;
   $L_1$ is a first linear linker section;
   $L_2$ is a second linear linker section;
   $\alpha$ is the angle between linear linker section $L_1$ and linear linker section $L_2$;
   AS is an angled linker section, connecting linear linker section $L_1$ and linear linker section $L_2$;
and,
B. optionally, at least a second linker molecule, wherein the second linker molecule is:
   a) a linker molecule according to Structure (I), wherein at least AS, $L_1$, $L_2$ or a is different from the AS, $L_1$, $L_2$ or $\alpha$ of the first linker molecule; or,
   b) a linker molecule according to Structure (II):

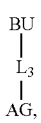

wherein
   AG is an anchoring group, for anchoring the linker molecule to the support film;
   BU is a binding unit, for binding to the analyte;
   $L_3$ is a third linear linker section;
wherein the linker molecules are attached to the support film via the anchoring group.

In some embodiments, the mixture of linker molecules comprises at least one further linker molecule according to structure (I), wherein at least AS, $L_1$, $L_2$ or $\alpha$ of the further linker molecule is different from the AS, $L_1$, $L_2$ or $\alpha$ of the other linker molecules in the mixture of linker molecules.

The term "linker section" as used herein refers to a part of atom-atom bonds that form a chain between the two ends of the linker molecules, i.e. the anchoring group AG on one end and the binding unit BU on the other end.

In analogy with polymers, a linker molecule comprises a linker-backbone and optionally side groups. Said linker backbone comprises a chain of atoms, connected via bonds necessary to connect the two ends of the linker molecule. One or more linker sections are parts of this linker-backbone.

The term "linear linker section" as used herein should preferably be interpreted in a functional way. A "linear linker section" is a linker section that extends essentially in one direction, the bond between the atoms of the linear linker section might be angled compared to each other, however a central axis can be defined along the general direction of the linker section. Preferably, the two endpoints of the linear linker section can be connected through said central axis. An example of a linear linker section is a polyethylene glycol (PEG) linker, as such a linker forms a linear molecule in its most stable confirmation. Another example of a linear linker might be a helical peptide, wherein the central axis in the helix is the linear direction of the linker. Due to vibration of the atoms in the linker section, the linear linker section may temporarily deviate from said extended (linear) orientation, however the assemble average of all the linker sections will remain extended, preferably linearly extended. Other non-limiting examples of linear linker sections are an alkyl chain, a polyester, a polyether, a polyalcohol, a polyglycol, a poly (N-isopropylacrylamide) (PNIPAM), a polyacrylamide (PAM), a poly (acrylic acid), a polymethacrylate, an acrylic polymer, or PEG.

In certain embodiments, the linear linker section is a flexible linear linker section, wherein the term "flexible" means that at least 50%, preferably at least 60%, preferably at least 70%, preferably at least 80%, preferably at least 90%, preferably all 100% of the bonds between the atoms in the linear linker section are single bonds. This level of flexibility allows for the linear linker section to extend in one direction, preferably away from the support film or the angled section. In some embodiments, the flexibility of the linear linker section is selected based on the balance between flexibility, accessibility and rigidity. Flexibility in the sense that it will introduce some hinge-like variability not going broader at least 45°, preferably at least 30°, preferably at least 15°, preferably at least 5° in analyte orientation. Accessibility, in the sense that the analyte can still bind to the binding unit and is not hindered sterically or due to a lack of space with regard to the support film.

Rigidity, in the sense that the flexibility does not cancel out the angle that is introduced by the angled linker section (AS). To this purpose the number of for example repeating unit in the linker section may in some embodiments, be at most 15 units or lower, preferably at least 10 units or lower, preferably at least 8 units or lower, preferably at least 6 units or lower, preferably at least 5 units or lower, preferably at least 4 units or lower, preferably at least 3 units or lower, preferably at least 2 units.

Preferably, the angle $\alpha$ between the linear linker section $L_1$ and the linear linker section $L_2$, is determined as the angle between the central axis of the first linear linker section $L_1$ and the central axis of the second linear linker section $L_2$ of one linker molecule. If these two central axes do not intersect, the angle may be determined after a parallel translation of on axis so that the two axes intersect.

The term "angled linker section" or AS is a linker section that brings linear linker section $L_1$ and linear linker section $L_2$ in non-aligned confirmation compared to each other. In some embodiments, the angled linker section causes the angle $\alpha$ to be different from 180°. Preferably, the angled linker section comprises at least one unsaturation, for example a double bound, a ring structure, a heterocycle or an aromatic system or a combination of thereof. Preferably, the angled linker section comprises at least one non-rotatable bond. The angled linker section may comprise more then one angled sub-sections, the angled sub-section may be connected via a flexible linker section.

In some embodiments, the angled linker section (AS) comprises a double bound, a ring structure, or an aromatic structure.

In some embodiments, the angled linker section (AS) comprises a double bound, preferably a carbon-carbon double bond, preferably is the double bond a cis-isomer double bond. Preferably, the substituents on the double bond are the first linear linker section $L_1$ and the second linear linker section $L_2$. The double bond prevents rotation around said bond, hence the substituents are locked in an angled position because of said double bond. In embodiments wherein the first linear linker section $L_1$ and the second linear linker section $L_2$ are in the cis-position of the double bond, see Structure III, they are locked in an angle of roughly 60° compared to each other, or $\alpha=60°$.

In embodiments wherein the first linear linker section $L_1$ and the second linear linker section $L_2$ are in the trans-position of the double bond, see Structure IV, they are locked in an angle of roughly 180° compared to each other, or $\alpha=180°$. In some embodiments, the angled linker section (AS) comprises a ring structure, preferably the ring structure may have at least 3 to at most 12 ring-atoms, preferably at least 4 to at most 10 ring-atoms, preferably at least 4 to at most 8 ring-atoms, preferably at least 5 to at most 6 ring-atoms. Preferably, the prediction of the first linear linker section $L_1$ and the second linear linker section $L_2$ are substituents on said ring-atoms. It should be understood that different substitution patterns on a same ring structure may result in different values for a. In some embodiments, the ring structure may be a heterocyclic compound, such as thiophene, furan, pyrrole, pyridine, indene, fluorene, carbazole, dibenzofuran to name a few. In some embodiments, the ring structure may be aromatic or partially aromatic.

In some embodiments, the angled linker section (AS) comprises an aromatic structure. Aromatic structures may be quite rigid, are may therefore be suitable as AS to dictate a certain angle $\alpha$ between the first linear linker section $L_1$ and the second linear linker section $L_2$. 5-membered aromatic structures, such as a furan structure allow a values of increments of 72°, depending on the position of the substituents. 6-membered aromatic structures, such as a benzene structure allow a values of increments of 60°, depending on the position of the substituents. In certain embodiments of the invention, the angled linker section (AS) may comprise more than one aromatic structure, or a polycyclic aromatic structure, such as naphthalene, anthracene, phenanthrene, phenalene or benzo[c]fluorene, to name a few.

In some embodiments, the angled linker section (AS) is selected from the list comprising moieties III to IX:

(III)

(IV)

(V)

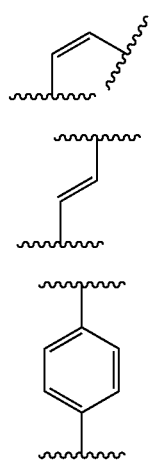

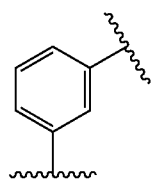
(VI)

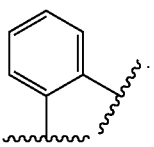
(VII)

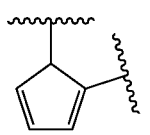
(VIII)

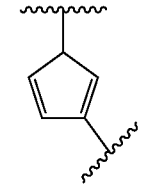
(IX)

In some embodiments, the second linker molecule may be formed from the first linker molecule, by chemical or physical modification such that after modification of at least AS, $L_1$, $L_2$ or $\alpha$ of formed second linker molecule is different from the AS, $L_1$, $L_2$ or $\alpha$ of the first linker molecule. Preferably, the chemical or physical modification of the linker molecule is photoisomerization. In some embodiments, the angled linker section may comprise a photoisomerizationable double bond, preferably a photo-isomerizationable nitrogen-nitrogen double bond. Photoisomerization of such a double bond may rearrange the linear linker sections from a cis orientation to a trans orientation, or vice versa. Such a rearrangement or switch between cis and trans isomer, changes the angle $\alpha$, so that a mixture of at least two different linker molecules can be realised before vitrification and obtaining an EM image.

In invention provides in a method for forming an electron microscopy grid according to an embodiment described herein, comprising the steps of:
  providing a perforated substrate;
  providing a support film on the perforated substrate;
  attaching first linker molecules according to Structure (I) to the support film via the anchoring group;
  partially modifying the linker molecules attached to the support film to second linker molecules according to Structure (I) attached to the support film; such that at least AS, $L_1$, $L_2$ or $\alpha$ of the second linker molecules is different from the AS, $L_1$, $L_2$ or $\alpha$ of the first linker molecule;
  wherein the modifying the linker molecules is chemical or physical, preferably by photoisomerization.

In some embodiments, the electron microscopy grid is a grid produced by the method described above.

In some embodiments, the angled linker section comprises an azobenzene moiety, which may be switched from the trans-isomer according to Structure (X) to the cis-isomer according to Structure (XI), depending on the wave length of the light at which the linker molecules are irradiated.

Azobenzene trans state     Azobenzene cis state

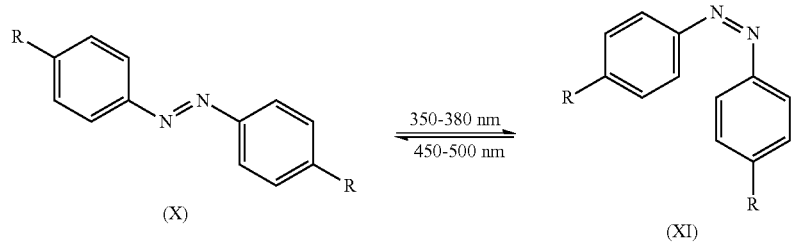

(X)     (XI)

In some embodiments, where linker molecules are being used wherein the angled linker section comprises a photo-isomerizationable structure, such as a photo-isomerizationable double bond, the EM-grid may be partially irradiated with the desired wavelength to cause the photo-isomerisation. The partial irradiation of the EM-grid may be regioselective wherein some regions of the grid are irradiated at a first wave length and other regions irradiated at a second wavelength, wherein the first wave length favours formation of trans-isomer and the second wavelength favours formation of the cis-isomer.

In some embodiments, the grids may be irradiated with a randomizing light composition, such as circular polarized light for when the AS comprises an azobenzene moiety. This randomizing light composition will cause a random distribution of the two isomers over the surface of the grid.

In some embodiment, the first linker molecule is a photo-isomerizationable linker molecule according to Structure XII:

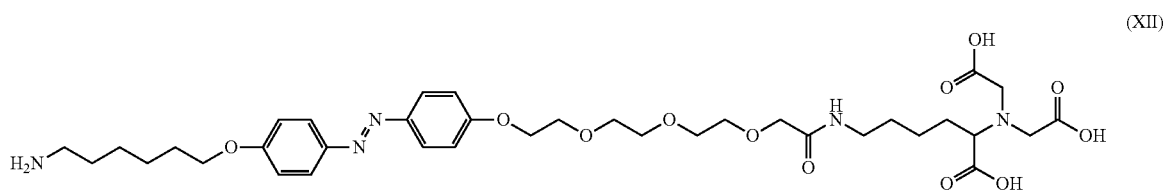 [SMILES: NCCCCCCOc1ccc(/N=N/c2ccc(OCCOCCOCCOCC(=O)NCCCCC(C(=O)O)N(CC(=O)O)CC(=O)O)cc2)cc1]

(XII)

In some embodiments, the angled linker section may comprise a heteroaryl azo dye, a stilbene, a spiropyran, a diarylethene, a thiophenefulgide, or hemithioindigo.

TABLE 1 examples of photo-isomerizationable angled linker sections

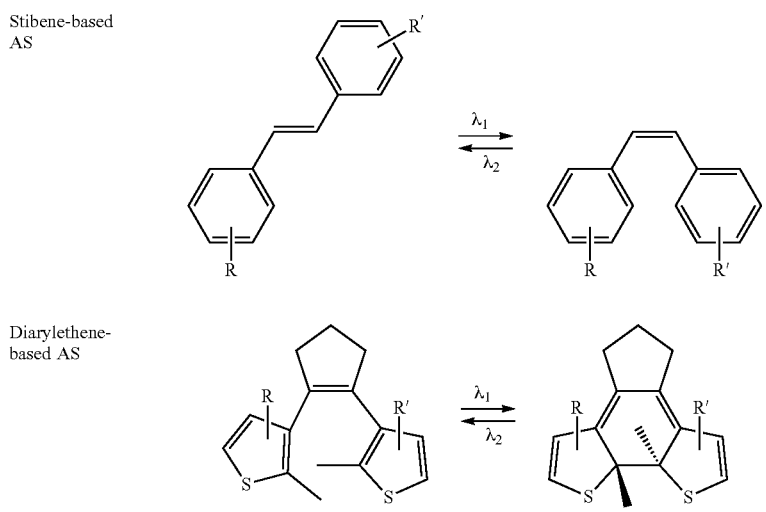

TABLE 1-continued examples of photo-isomerizationable angled linker sections

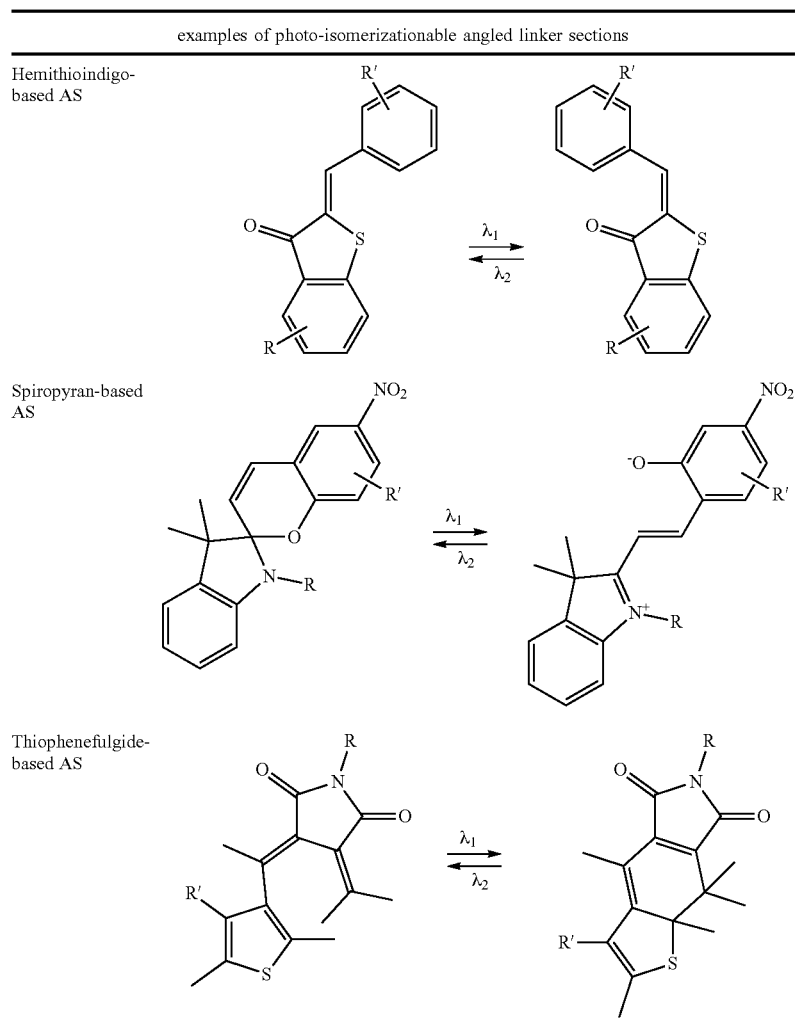

Hemithioindigo-based AS

Spiropyran-based AS

Thiophenefulgide-based AS

In some embodiment, the linker molecules as thought herein may comprise more than one angled linker section. In some embodiments, the linker molecules as thought herein may comprise more than one photo-isomerizationable structure, for example two or three photo-isomerizationable structures. In some embodiments, the linker molecules as thought herein may comprise more than one photo-isomerizationable structure, wherein each photo-isomerizationable structure isomerise at a different wavelength. Partially irradiating the EM-grid with these different wavelengths, may result in multiple different orientations.

In some embodiments, $L_1$, $L_2$ and $L_3$ are independently an alkyl chain, a polyester, a polyether, a polyalcohol, a polyglycol, a poly (N-isopropylacrylamide) (PNIPAM), a polyacrylamide (PAM), a poly (acrylic acid), a polymethacrylate, an acrylic polymer, a PEG, a polypeptide, DNA, RNA, peptide nucleic acid (PNA) or another DNA mimic.

In some embodiments, $L_1$, $L_2$ and $L_3$ are independently —($CH_2$—$CH_2$—O—)$_n$—, —($CH_2$—$CH_2$—NH—)$_n$—, —($CH_2$—)$_n$—, a polypeptide comprising n amino acids, DNA comprising n nucleotides, RNA comprising n nucleotides, peptide nucleic acid (PNA) comprising n nucleotides, any other DNA mimic comprising n building blocks.

In some embodiments, $L_1$, $L_2$ and $L_3$ are independently-(—$CH_2$—$CH_2$—O—)$_n$—, —(—$CH_2$—$CH_2$—NH—) n, or a polypeptide comprising n amino acids;
wherein n is an integer of at least 1, preferably in n an integer larger than 1 . . .

In some embodiments, each of $L_1$, $L_2$ and $L_3$ may be a helical peptide. Non-limiting examples of suitable peptide sequences are (Glu-Ala-Ala-Lys) n or a Proline-rich sequence (XPro)$_n$, with X designating any amino acid, preferably Ala, Lys, or Glu and whereby n is preferably 2 to 5. The attachment of the polypeptides to the AG, AS and/or BU may be via the C-terminus, the N-terminus or via a reactive side chain, such as the side chains of Lys or Arg, which comprise an amine, the side chains of Glu or Asp comprising an carboxyl group, or the side chain of Cys comprising a thiol group.

In some embodiments, n is at least 1 to at most 15, preferably at least 1 to at most 13, preferably at least 1 to at most 10, preferably at least 1 to at most 5, preferably at least 1 to at most 3, preferably at least 1 to at most 2.

In some embodiments, n is at least 1, preferably at least 2, preferably at least 3, preferably at least 5, preferably at least 7, preferably at least 10.

In some embodiments, n is at most 15, preferably at most 13, preferably at most 10, preferably at most 5, preferably at most 3, preferably at most 2.

In some embodiments, the length of $L_1$ is at least 0.35 nm, preferably at least 0.70 nm, preferably at least 1.00 nm, preferably at least 2.00 nm, preferably at least 5.00 nm, preferably at least 10.00 nm.

In some embodiments, the length of $L_1$ is at most 50.00 nm, preferably at most 25.00 nm, preferably at most 20.00 nm, preferably at most 15.00 nm, preferably at most 10.00 nm, preferably at most 5.00 nm.

In some embodiments, the length of $L_2$ is at least 0.35 nm, preferably at least 0.70 nm, preferably at least 1.00 nm, preferably at least 2.00 nm, preferably at least 5.00 nm, preferably at least 10.00 nm.

In some embodiments, the length of $L_2$ is at most 50.00 nm, preferably at most 25.00 nm, preferably at most 20.00 nm, preferably at most 15.00 nm, preferably at most 10.00 nm, preferably at most 5.00 nm.

In some embodiments, the length of $L_3$ is at least 0.70 nm, preferably at least 1.50 nm, preferably at least 2.00 nm, preferably at least 4.00 nm, preferably at least 10.00 nm, preferably at least 200.00 nm.

In some embodiments, the length of $L_3$ is at most 100.00 nm, preferably at most 75.00 nm, preferably at most 50.00 nm, preferably at most 30.00 nm, preferably at most 20.00 nm, preferably at most 10.00 nm.

Such length allows for sufficient room between the support film and the analyte but prevents the analyte sticking out of the vitreous ice layer on the EM grid when used for cryo-EM. A too high length and/or degree of flexibility will disrupt the impact of the angle introduced by AS. Furthermore, the bulkier or the longer the length of the linker, the more it will contribute to the determined analyte density during image processing protocols. A too high density caused by too long linker molecules may disturb classification algorithms as it is less structured then the analyte and hence it will reduce the resolution that can be reached.

In some embodiments, the anchoring group (AG) is an amine group, a maleimide group, a thiol group, a diazonium group or a carbonyl group.

In some embodiments, attaching the linker molecules to the support film may involve electrochemical or chemical activation of the anchoring group, e.g. the diazonium group, for example by an electrochemical or chemical reduction.

In some embodiments, the surface of the support film may be functionalised prior to attachment of the linker molecules via the anchoring group. For example, a carboxyl group may for example be formed on graphene through an oxidation procedure based on UV-ozone treatment or KMnO4 treatment, while other chemical groups can be attached through plasma-based chemical functionalization.

In some embodiments, the binding unit (BU) is an analyte specific binding unit.

The term "binding unit" as used herein, may refer to a unit or group that is involved in the immobilization of the analyte. The binding unit may be any reactive group that interacts with or binds to the analyte. The binding unit may be an affinity group or may be able to be modified with an affinity group. The term "affinity group" as used herein, should be interpreted as a group that only specifically bind to a certain binding motif or affinity tag on the analyte. Hence, using an affinity group in the binding unit, a certain analyte can be immobilized on the grid in the presence of other molecules. For example, a tagged protein can selectively be immobilized out of a cell lysate. This may make certain purification steps of the analyte unnecessary. When the binding unit comprises such an affinity group, the grid may be classified as an "affinity grid". Furthermore, the analyte can also be a binding partner of a second analyte, such as a Fab fragment, whereby the Fab fragment is immobilized first to the grid, followed by the second specific protein target.

In some embodiments, the electron microscopy grid is an affinity electron microscopy grid.

In some embodiments, at least one affinity group may be selected from the list of a deoxyribonucleic acid (DNA), a ribonucleic acid (RNA), a sugar, a peptide, a protein (e.g. an antibody or a nanobody), a lipid, a nickel nitrilotriacetic acid (Ni-NTA), cobalt nitrilotriacetic acid (Co-NTA), HaloTag® Ligand (e.g. obtained from Promega), haloalkane tag, chloro-alkane tag, SnapTag® Ligand (e.g. obtained from NEB), SpyTag, SpyCatcher, a peptide sequence recognized and ligated by Sortase A, or any other natural or synthetic chemical probe that can be used to selectively bind a specific analyte.

In some embodiments, the affinity tag on the analyte may be selected from the list of HisTag, a HaloTag®, a SnapTag®, SpyTag, SpyCatcher, etc. Other useable affinity tags and corresponding affinity groups are for example, without being limited thereto, as described by Kimple et al. (KIMPLE, Michelle E.; BRILL, Allison L.; PASKER, Renee L. Overview of affinity tags for protein purification. Current protocols in protein science, 2013, 73.1:9.9. 1-9.9. 23.), which is incorporated herein by reference; see therein for example Table 9.9.1.

In some embodiments, mixtures of different affinity groups e.g. each having an affinity for different analytes, may be used on the linker molecules. This way multiplex measurements can be performed. Furthermore, such an EM grid may also be used to test the binding affinity of an analyte simultaneously towards several affinity groups, e.g. when the preferred affinity group for the analyte in question is not yet determined. Such an EM grid could, for example, be leveraged as a drug screening platform to validate and identify potential binding partners (hit validation, lead optimization, etc.) and to provide structural information on their binding position.

In some embodiments, the linker molecule comprises side chains covalently bound to the anchoring group (AG), the first linear linker section ($L_1$) or the third linear linker section ($L_3$), preferably said side chains are t-butyl side chains or branched alkyl side chains. Such side chains may allow for a better spatial distribution of the linker molecules on the surface of the support film. This may avoid linker molecules to be too close to each other so that the analyte may touch or interact with each other, which deteriorate the image quality and resolution obtained in the EM.

In some embodiments, the mixture of linker molecules comprises at least two linker molecules according to structure (I) of which the angle (a) for each of said at least two linker molecules differs at least 10°, preferably at least 20°, preferably at least 30°, preferably at least 40°, preferably at least 45°, preferably at least 50°, preferably at least 55°, preferably at least 60°, preferably at least 75°, preferably at least 90°, preferably at least 120°, preferably at least 150°, preferably at least 180°.

In some embodiments, the support film is a graphene support film, a graphene-oxide support film, a graphite support film, an amorphous carbon support film, a diamond support film, a silicon oxide support film or a silicon nitride support film.

In some embodiments, the perforated substrate comprises: a mesh structure, and a perforated sheet on the mesh structure.

As used herein, the term "perforated" means having through-holes therein.

In certain embodiments, the support film having a thickness of 60 Å or less, preferably 40 Å or less preferably 20 Å or less, preferably 10 Å or less, preferably 3 Å or less.

In embodiments, the support film may be selected from graphene, graphene oxide and graphite. In other embodiments, the support film may be formed of another 2D material (e.g. a transition metal dichalcogenide or hexagonal boron nitride), another carbon-based material (e.g. amorphous carbon, diamond or diamond-like carbon), a semiconductor material (e.g. a thin layer of silicon or silicon dioxide), an organic molecule (e.g. a self-assembled monolayer, SAM) or a bio-molecule. In some embodiments, the support film may be molecularly or atomically thin, preferably atomically thin. In some embodiments, the support film may be a molecular monolayer (e.g. a SAM) or an atomic monolayer (e.g. single-layer graphene or other 2D material); preferably an atomic monolayer. Thinner support films advantageously interfere less with the EM imaging; the EM signal (i.e. the effect on amplitude and phase contrast) produced by vanishingly thin (e.g. atomically thin) support films may, for example, be neglectable.

In some embodiments, the EM grid may be for (i.e. suitable for) protein structure determination. In some embodiments, the protein structure determination may have a resolution of 10 Å or less; i.e. it may be a high-resolution protein structure determination. Protein structure determination typically hinges on a good analyte EM signal, with minimal interference from the EM grid. In that respect, support films having a thickness of 20 Å or less typically yield a suitable signal-to-noise ratio, which is further improved for thicknesses of 10 Å or less, etc.; such thicknesses are therefore increasingly preferred. For comparison, a single graphene layer has a thickness of about 3 Å (e.g. 3.35 Å) In some embodiments, the support film may be an ordered (e.g. crystalline) support film. Ordered support films advantageously yield an EM signal (e.g. a regular EM signal) which can be subtracted from the overall EM signal, thereby reducing or removing the influence of the ordered support film on the EM imaging. In preferred embodiments, the support film may be a conductive support film. Conductive support films advantageously provide an avenue for electrical charge carriers to dissipate in, thereby counteracting local charging effect (e.g. on the analyte) that can occur and that may influence the EM signal.

In some embodiments, the mesh structure may comprise a metal. In embodiments, the metal may be selected from the list of Cu, Ni, Ti, Si, Au, CuRh, Mo, Al and W. In some embodiments, the perforated sheet (e.g foil) may comprise a material selected from amorphous carbon, Au, TiSi, SiN, SiO2 and SiC. In some embodiments, the perforated foil may have a thickness of from 1 to 50 nm, e.g. from 5 to 30 nm. In some embodiments, the perforated sheet (e.g. a foil) may be a lacey foil (e.g. a lacey carbon foil), a holey foil (e.g. a holey carbon foil) or a Quantifoil. These perforated foils as such, as well as EM grids therewith (i.e. having said perforated foils on a mesh structure), may be commercially available. In embodiments, the perforated substrate and/or the perforated sheet (e.g. foil) may comprise random perforations (e.g. as in lacey or holey foil) or regularly patterned perforations (e.g. as in Quantifoil).

In some embodiments, the perforated substrate having the support film assembled thereon may be provided as such. For example, a perforated substrate with a pre-assembled support film may be commercially purchased. In some embodiments, an auxiliary substrate may be present between the support film and the perforated substrate.

In some embodiments, the support film may be formed on the perforated substrate, or the support film and the perforated substrate may be assembled. In embodiments, transferring the support film may comprise a wet transfer, dry transfer or sandwich-based transfer. Such a wet- or dry-transfer is described for pristine (i.e. unfunctionalized) graphene by Suk et al. (SUK, Ji Won, et al. Transfer of CVD-grown monolayer graphene onto arbitrary substrates. ACS nano, 2011, 5.9:6916-6924.), which is incorporated herein by reference. The sandwich-based transfer of graphene onto non-copper supports with foils has been described in particular for electron microscopy grids by Passmore and Russo (PASSMORE, Lori A.; RUSSO, Christopher J. Specimen preparation for high-resolution cryo-EM. In: Methods in enzymology. Academic Press, 2016. p. 51-86.).

In some embodiments, the analyte may be a biomolecule, a lipid vesicle, or a nanoparticle, preferably a protein, a nucleic acid, a carbohydrate, a lipid vesicle, a nanoparticle or a combination thereof. The analyte may be a complex, such as a complex of biomolecules, or a complex of a biomolecule and a ligand, a drug candidate or small molecule.

The invention provides in a method for immobilizing an analyte on an electron microscopy grid comprising:
A. providing an electron microscopy grid as described herein;
B. contacting the electron microscopy grid with a solution comprising the analyte, thereby immobilizing the analyte on the electron microscopy grid by the formation of a bond between the binding unit and the analyte;
C. optionally, partially or fully removing the solution from the electron microscopy grid.

In the art, methods for immobilizing an analyte on an electron microscopy grid are often referred to as "priming methods".

In some embodiments, the analyte comprises a binding motif of an affinity tag which specifically binds to the binding unit.

The invention provides a method for determining the structure of an analyte, comprising:
a) the method for immobilizing the analyte as described herein, providing a primed electron microscopy grid;
b) vitrifying the primed electron microscopy grid obtained in a);
c) acquiring electron microscopy images from the electron microscopy grid obtained in b);
d) reconstructing the structure of the analyte from said electron microscopy images.

In some embodiments, the primed electron microscopy grid may be vitrified, thereby forming a vitreous ice layer on the EM grid to fix the orientation of the analyte. In embodiments, the vitreous ice layer may have a thickness of 300 nm or lower, preferably 150 nm or lower, yet more preferably 100 nm or lower.

In some embodiments, electron microscopy images may be acquired using transmission electron microscopy (TEM). Hence, in some embodiments, the EM grid may be a TEM grid.

In some embodiments, electron microscopy images may be acquired by cryo-electron microscopy and/or negative stain electron microscopy, preferably by cryo-electron microscopy.

In some embodiments, the magnification of the microscope may be adapted to obtain a pixel resolution of 1 Å per pixel; this corresponds to a 200×200 nm image for a 2k×2k detector. Such a resolution may typically be sufficient to obtain good structural information.

In embodiments, reconstructing the structure of the analyte from said electron microscopy images may involve a particle picking algorithm (i.e. a method for determining the location of one or more analytes in an image, e.g. an EM image).

In embodiments, reconstructing the structure of the analyte from said electron microscopy images may involve classification procedures to generate a 3D density volume, preferably using a 3D reconstruction algorithm.

In embodiments, the method for determining the structure of an analyte may be a computer-implemented method. In embodiments, steps c) and/or d) may be fully implemented by a data processing system.

The invention provides in a linker molecule suitable for attaching an analyte to a support film or a surface, according to structure (I):

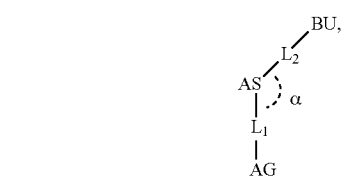

(I)

wherein:

AG is an anchoring group, for anchoring the linker molecule to the support film or the surface;

BU is a binding unit, for binding to the analyte;

$L_1$ is a first linear linker section;

$L_2$ is a second linear linker section;

$\alpha$ is the angle between the linear linker section $L_1$ and the linear linker section $L_2$;

AS is an angled linker section, connecting the linear linker section $L_1$ and the linear linker section $L_2$; and, preferably wherein the anchoring group (AG) is an amine group, a maleimide group, a thiol group, a diazonium group or a carbonyl group.

In some embodiments, the linker molecule is selected from any one of the following Structures XIII to XXVI:

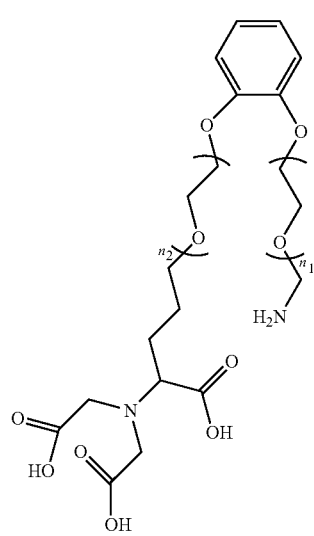

(XIII)

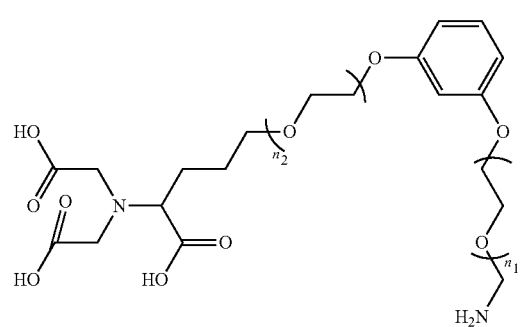

(XIV)

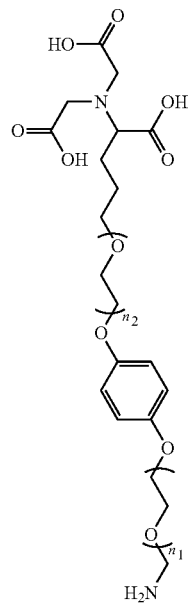

(XV)

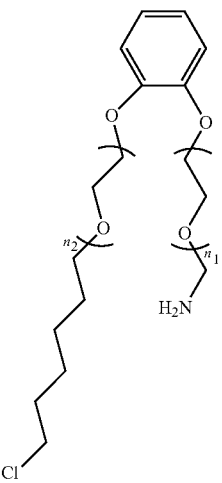

(XVI)

-continued
(XVII)
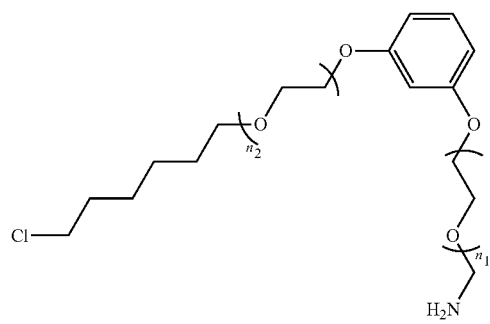
(XVIII)
(IXX)
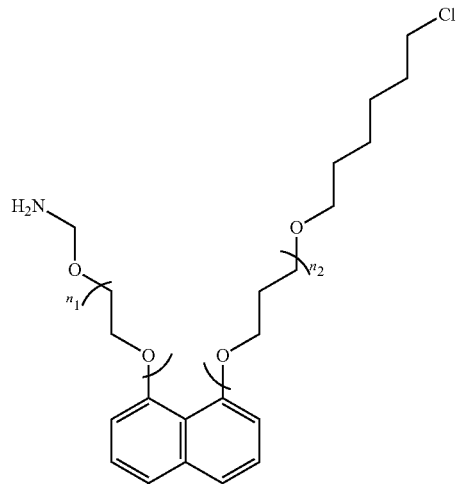
(XX)
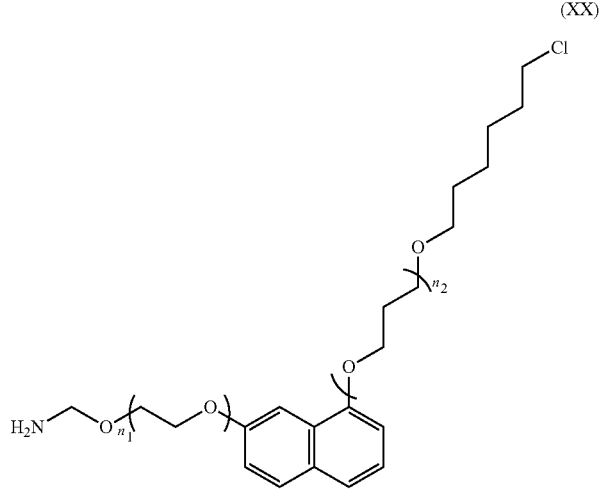

-continued
(XXI)
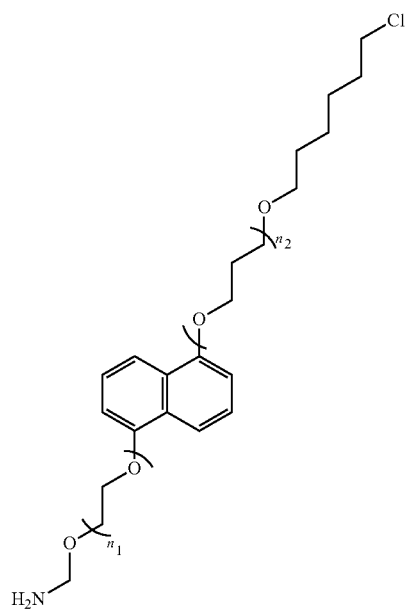
(XXII)
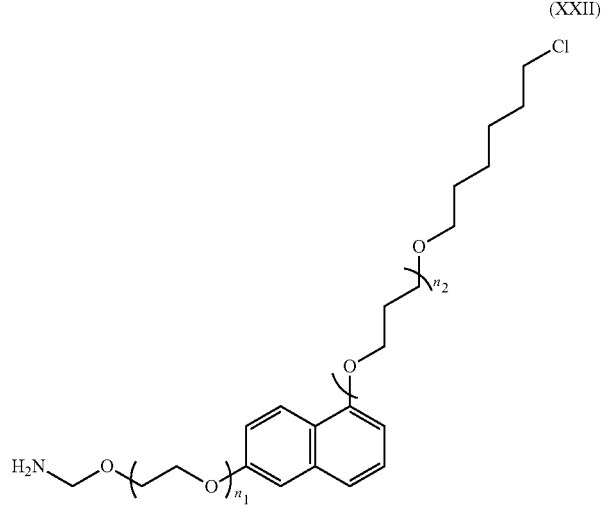
(XXIII)
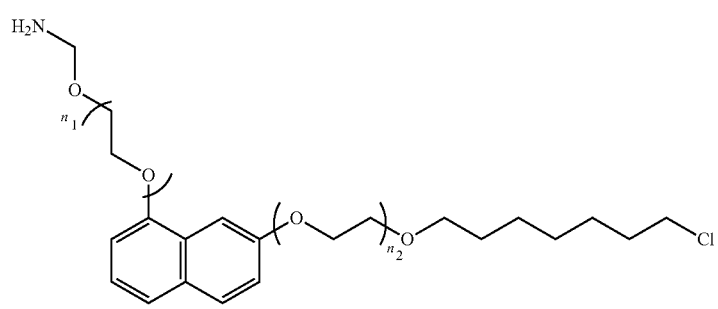
(XXIV)
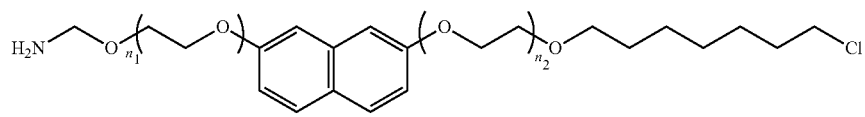
(XXV)
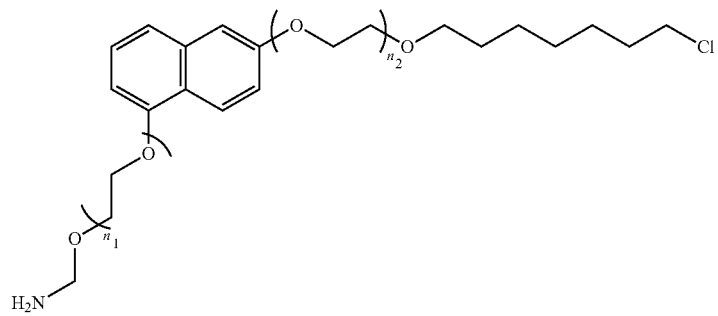
(XXVI)
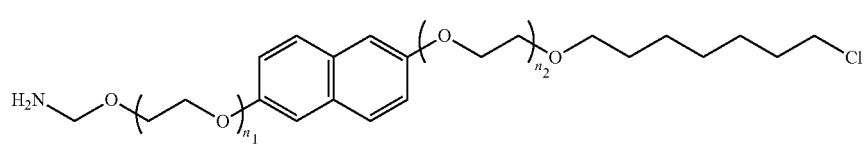

The invention will now be described by a detailed description of several embodiments of the invention. It is clear that other embodiments of the invention can be configured according to the knowledge of the person skilled in the art without departing from the true technical teaching of the invention, the invention being limited only by the terms of the appended claims.

EXAMPLES

FIG. 1 shows a diagram of an electron microscopy grid (6) according to an embodiment of the invention, wherein the mixture of linker molecules comprises a first linker molecule (1) and a second linker molecule (2). A support film (4) is provided on a perforated substrate (5). To said support film a mixture of a first linker molecule (1) and a second linker molecule (2) is covalently attached, via anchoring groups (11, 21). Each linker molecule (1, 2) comprises a first linear linker section (12, 22), an angled linker section (13, 23), a second linear linker section (14, 24) and a binding unit (15, 16). As the angled sections (13, 23) are different for the first linker molecule (1) and the second linker molecule (2), the angles $\alpha_1$ and $\alpha_2$ are different. This results in that analyte (16) bond to first binding unit (15) has a different orientation than analyte (26) bond to second binding unit (25). As none of the linker molecules (1,2) are completely rigid, some variation in the orientation of the analyte occurs, which is also indicated in FIG. 1.

Figure 2:
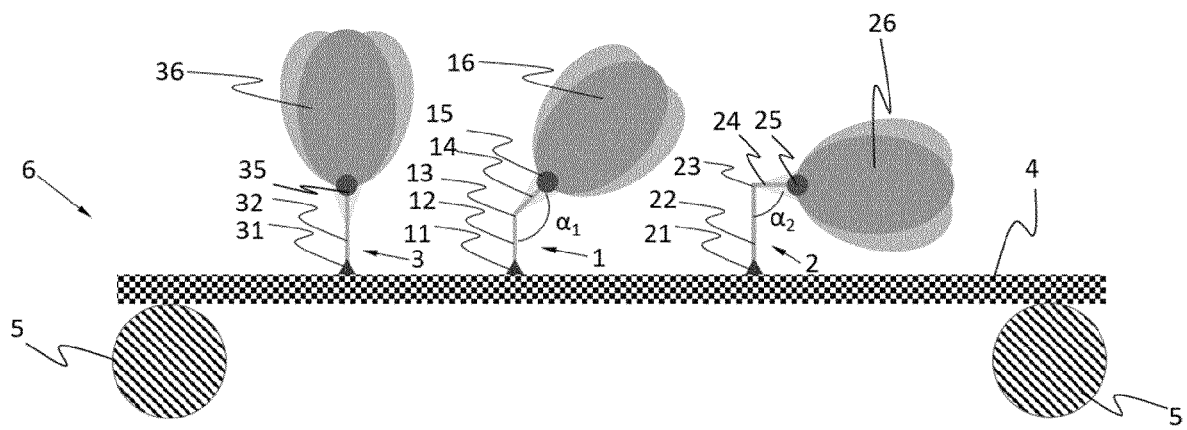
FIG. 2 shows a diagram of an electron microscopy grid according to an embodiment of the invention, wherein the mixture of linker molecules comprises besides the first linker molecule and the second linker molecule as shown in FIG. 1, a third linker molecule according to Structure II as described herein.

FIG. 2 shows a diagram of an electron microscopy grid (6) according to an embodiment of the invention, wherein the mixture of linker molecules comprises besides the first linker molecule (1) and the second linker molecule (2) as shown in FIG. 1, a third linker molecule (3) according to Structure II as described herein. The third linker molecule (3) comprises an anchoring group (31) a third linear linker section (32) and a third binding unit (35). The presence of the third linker molecule (3) in the mixture of linker molecules provides a third orientation of the analyte (36) bound to said third linker molecule (3).

Figure 3:
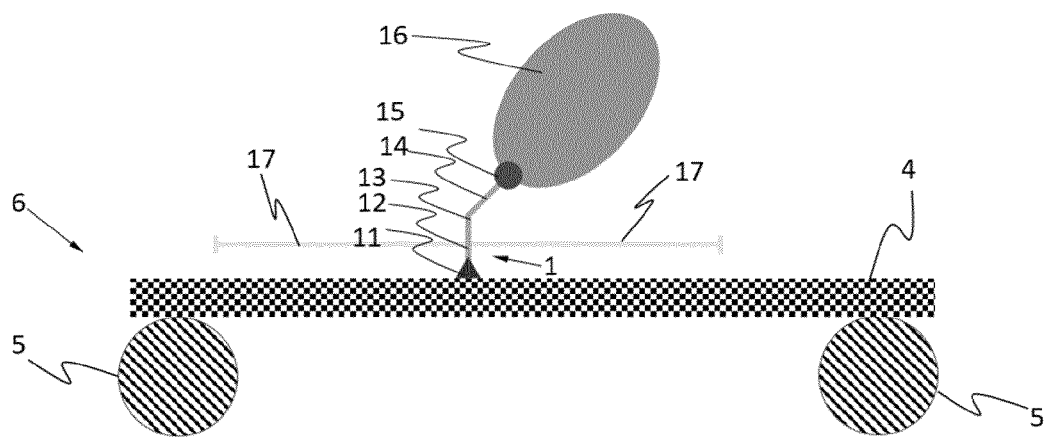
FIG. 3 shows a diagram of a part of the electron microscopy grid according to an embodiment of the invention, wherein the linker molecule comprises all the features of the linker molecule in FIG. 1, and bulky side chains.

FIG. 3 shows a diagram of a part of the electron microscopy grid (6) according to an embodiment of the invention, wherein the linker molecule (1) comprises all the features of the linker molecule (1) in FIG. 1, and bulky side chains (17).

Figure 4:
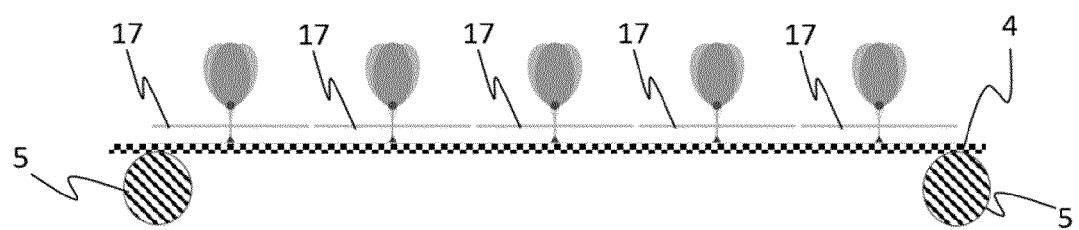
FIG. 4 depicts the effect of using linker molecules comprising bulky side chains. The effect is a better spatial distribution of the analyte on the electron microscopy grid.

FIG. 4 depicts the effect of using linker molecules comprising bulky side chains (17). The effect is a better spatial distribution of the analyte on the electron microscopy grid.

Priming of the Grids and EM Measurement

Affinity grids according to an embodiment of the invention can be produced using a standard cryo-EM TEM grid, comprising a metal frame, a perforated support film and a continuous single layer graphene layer or graphene oxide layer (e.g. Quantifoil AU 1.2/1.3). In case a graphene layer is used as support layer, the surface can be activated before the deposition on a TEM grid with a perforated support film or be activated once assembled on top of the perforated film. This activation can be done through wet chemistry, uv-ozon, plasma treatment or electrochemistry. In case the surface anchoring group is a carboxyl group, a drop of 2-4 µl of a 5mMEDC/sulfo-NHS mixture in a 0.1M MES buffer (pH 5) can be placed on top of the support film and blotted away after 1 hr. This is used to optimize the reaction mechanism between the surface carboxyl group and the amine anchoring group of the different linker molecules in the mixture. Once the graphene layer is activated, 2-4 µl of a 50 mM TBE buffer solution comprising mixture of linker molecules in a 1:1 ratio is brought upon the grid and blotted away after ~1 hr (without completely drying the grid). The chemical reaction is stopped by washing it with an amine-comprising buffer such as 10 mM hydroxylamine or 20-50 mM Tris, followed by 1-5 washing steps with pure distilled $H_2O$. The grid functionalized with the mixture of linker molecules is subsequently primed with the protein target sample. Depending on the protein concentration of the sample a droplet of 2-4 µl is placed on-top of the grid for 10 mins or 1 hr or even longer. Subsequently, the cryo-EM grid is washed 1-3 times with the protein buffer after which the primed grid carrying a 2-4 µl droplet is placed into a plunge-freezer and vitrified. The final vitrified cryo-EM grid is used for cryo-electron microscopy imaging. All steps are done within a temperature and humidity controlled environment.

Control Experiments

To test the influence of each individual AS unit of a linker on the angular distribution, grids with single type of linker are fabricated. The grids are primed with a protein sample comprising a complementary binding unit (e.g. Ni-NTA and a HisTag or HaloLigand and a Halotag). The primed grids are plungefrozen (for example 1s blotting force, 1s blotting time) and an electron cryo microscopy image dataset is collected. For each dataset individual protein particles are selected and processed using a dedicated image processing software package (e.g. Relion) to obtain 2D class averages. A comparison of the different class averages of each separate dataset, related to a single linker, is used to identify and differentiate dominant representative classes for each linker (i.e. class averages that represent the major part of the particles). This information is used to discriminate between different linker molecules and determine which set of linker molecules is optimal for covering the broadest angular distribution.

Secondly, the datasets of the different grids each functionalised with a single type of linker molecules, can be combined into a singular dataset and by adding/removing particles from different datasets, we can repeat the 3D classification and 3D refinement procedure and determine the effect of each AS linker on the resolution of the particles. Specifically, after the 3D refinement each individual particle will have euler angles related to the 3D structure of the protein. For each individual particle the original dataset can be retrieved and hence the linker molecule.

The invention claimed is:

1. An electron microscopy grid, comprising:
   a perforated substrate;
   a support film on the perforated substrate;
   a mixture of linker molecules, wherein said mixture of linker molecules comprises:
   A. at least a first linker molecule according to Structure (I)

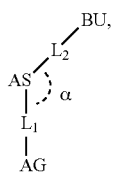
(I)

wherein
   AG is an anchoring group, for anchoring the linker molecule to the support film;
   BU is a binding unit, for binding to the analyte;
   L1 is a first linear linker section;
   L2 is a second linear linker section;
   α is the angle between linear linker section L1 and linear linker section L2;
   AS is an angled linker section, connecting linear linker section L1 and linear linker section L2;
   and,
   B. at least a second linker molecule, wherein the second linker molecule is:
      a. a linker molecule according to structure (I), wherein at least AS, L1, L2 or α is different from the AS, L1, L2 or α of the first linker molecule; or,
      b. a linker molecule according to structure (II):

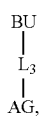
(II)

wherein
   AG is an anchoring group, for anchoring the linker molecule to the support film;
   BU is a binding unit, for binding to the analyte;
   L3 is a third linear linker section;
   wherein the linker molecules are attached to the support film via the anchoring group.

2. The electron microscopy grid according to claim 1, wherein the electron microscopy grid is an affinity electron microscopy grid.

3. The electron microscopy grid according to claim 1, wherein the angled linker section comprises a double bound, a ring structure, or an aromatic structure.

4. The electron microscopy grid according to claim 1, wherein L1, L2 and L3 are independently -(—$CH_2$—$CH_2$—O—)$_n$—, —(—$CH_2$—$CH_2$—NH—)$_n$—, ($CH_2$)$_n$—, a polypeptide comprising n amino acids,
   wherein n is an integer of at least 1.

5. The electron microscopy grid according to claim 4, wherein n is at least 1 to at most 15, or at least 1 to at most 13, or at least 1 to at most 10, or at least 1 to at most 5, or at least 1 to at most 3, or at least 1 to at most 2.

6. The electron microscopy grid according to claim 1, wherein the anchoring group (AG) is an amine group, a maleimide group, a thiol group, a diazonium group or a carbonyl group.

7. The electron microscopy grid according to claim 1, wherein the binding unit (BU) comprises an affinity group.

8. The electron microscopy grid according to claim 1, wherein the first linker module and/or second linker molecule comprises side chains covalently bound to the anchoring group (AG), the first linear linker section (L1) or the third linear linker section (L3), wherein said side chains are t-butyl side chains or branched alkyl side chains.

9. The electron microscopy grid according to claim 1, wherein the mixture of linker molecules comprises at least two linker molecules according to structure (I) of which the angle (α) for each of said at least two linker molecules differs at least 10°, or at least 20°, or at least 30°, or at least 60°, or at least 90°, or at least 120°, preferably at least 150°, or at least 180°.

10. A method for forming an electron microscopy grid according to claim 1, comprising the steps of:
    providing a perforated substrate;
    providing a support film on the perforated substrate;
    attaching first linker molecules according to Structure (I) to the support film via the anchoring group;
    partially modifying the linker molecules attached to the support film to second linker molecules according to Structure (I) attached to the support film; such that at least AS, L1, L2 or α of the second linker molecules is different from the AS, L1, L2 or α of the first linker molecule;
    wherein the modifying the linker molecules is chemical or physical.

11. A method for forming an electron microscopy grid according to claim 1, comprising the steps of:
    providing a perforated substrate;
    providing a support film on the perforated substrate;
    attaching first linker molecules according to Structure (I) to the support film via the anchoring group;
    partially modifying the linker molecules attached to the support film to second linker molecules according to Structure (I) attached to the support film; such that at least AS, L1, L2 or α of the second linker molecules is different from the AS, L1, L2 or α of the first linker molecule;
    wherein the modifying the linker molecules is chemical or physical, preferably by photoisomerization.

12. A method for immobilizing an analyte to an electron microscopy grid comprising:
    A. providing an electron microscopy grid according to claim 1;
    B. contacting the electron microscopy grid with a solution comprising the analyte, thereby immobilizing the analyte on the electron microscopy grid by the formation of a bond between the binding unit and the analyte;
    C. partially or fully removing the solution from the electron microscopy grid.

13. The method according to claim 12, wherein the analyte comprises a binding motif which specifically binds to the binding unit.

14. A method for determining the structure of an analyte, comprising:
    a) the method for immobilizing the analyte according to claim 12, providing a primed electron microscopy grid;
    b) vitrifying the primed electron microscopy grid obtained in a);

c) acquiring electron microscopy images from the electron microscopy grid obtained in b);
d) reconstructing the structure of the analyte from said electron microscopy images.

\* \* \* \* \*

SEQUENCE LISTING

<160> NUMBER OF SEQ ID NOS: 9

<210> SEQ ID NO 1
<211> LENGTH: 4
<212> TYPE: PRT
<213> ORGANISM: Artificial Sequence
<220> FEATURE:
<223> OTHER INFORMATION: synthetic peptide

```
<400> SEQUENCE: 1

Glu Ala Ala Lys
1

<210> SEQ ID NO 2
<211> LENGTH: 4
<212> TYPE: PRT
<213> ORGANISM: Artificial Sequence
<220> FEATURE:
<223> OTHER INFORMATION: synthetic peptide
<220> FEATURE:
<221> NAME/KEY: misc_feature
<222> LOCATION: (1)..(1)
<223> OTHER INFORMATION: Xaa can be any naturally occurring amino acid
<220> FEATURE:
<221> NAME/KEY: misc_feature
<222> LOCATION: (3)..(3)
<223> OTHER INFORMATION: Xaa can be any naturally occurring amino acid

<400> SEQUENCE: 2

Xaa Pro Xaa Pro
1

<210> SEQ ID NO 3
<211> LENGTH: 6
<212> TYPE: PRT
<213> ORGANISM: Artificial Sequence
<220> FEATURE:
<223> OTHER INFORMATION: synthetic peptide
<220> FEATURE:
<221> NAME/KEY: misc_feature
<222> LOCATION: (1)..(1)
<223> OTHER INFORMATION: Xaa can be any naturally occurring amino acid
<220> FEATURE:
<221> NAME/KEY: misc_feature
<222> LOCATION: (3)..(3)
<223> OTHER INFORMATION: Xaa can be any naturally occurring amino acid
<220> FEATURE:
<221> NAME/KEY: misc_feature
<222> LOCATION: (5)..(5)
<223> OTHER INFORMATION: Xaa can be any naturally occurring amino acid

<400> SEQUENCE: 3

Xaa Pro Xaa Pro Xaa Pro
1               5

<210> SEQ ID NO 4
<211> LENGTH: 8
<212> TYPE: PRT
<213> ORGANISM: Artificial Sequence
<220> FEATURE:
<223> OTHER INFORMATION: synthetic peptide
<220> FEATURE:
<221> NAME/KEY: misc_feature
<222> LOCATION: (1)..(1)
<223> OTHER INFORMATION: Xaa can be any naturally occurring amino acid
<220> FEATURE:
<221> NAME/KEY: misc_feature
<222> LOCATION: (3)..(3)
<223> OTHER INFORMATION: Xaa can be any naturally occurring amino acid
<220> FEATURE:
<221> NAME/KEY: misc_feature
<222> LOCATION: (5)..(5)
<223> OTHER INFORMATION: Xaa can be any naturally occurring amino acid
<220> FEATURE:
<221> NAME/KEY: misc_feature
<222> LOCATION: (7)..(7)
<223> OTHER INFORMATION: Xaa can be any naturally occurring amino acid

<400> SEQUENCE: 4

Xaa Pro Xaa Pro Xaa Pro Xaa Pro
```

```
<210> SEQ ID NO 5
<211> LENGTH: 10
<212> TYPE: PRT
<213> ORGANISM: Artificial Sequence
<220> FEATURE:
<223> OTHER INFORMATION: synthetic peptide
<220> FEATURE:
<221> NAME/KEY: misc_feature
<222> LOCATION: (1)..(1)
<223> OTHER INFORMATION: Xaa can be any naturally occurring amino acid
<220> FEATURE:
<221> NAME/KEY: misc_feature
<222> LOCATION: (3)..(3)
<223> OTHER INFORMATION: Xaa can be any naturally occurring amino acid
<220> FEATURE:
<221> NAME/KEY: misc_feature
<222> LOCATION: (5)..(5)
<223> OTHER INFORMATION: Xaa can be any naturally occurring amino acid
<220> FEATURE:
<221> NAME/KEY: misc_feature
<222> LOCATION: (7)..(7)
<223> OTHER INFORMATION: Xaa can be any naturally occurring amino acid
<220> FEATURE:
<221> NAME/KEY: misc_feature
<222> LOCATION: (9)..(9)
<223> OTHER INFORMATION: Xaa can be any naturally occurring amino acid

<400> SEQUENCE: 5

Xaa Pro Xaa Pro Xaa Pro Xaa Pro Xaa Pro
1               5                   10

<210> SEQ ID NO 6
<211> LENGTH: 4
<212> TYPE: PRT
<213> ORGANISM: Artificial Sequence
<220> FEATURE:
<223> OTHER INFORMATION: synthetic peptide
<220> FEATURE:
<221> NAME/KEY: PEPTIDE
<222> LOCATION: (1)..(1)
<223> OTHER INFORMATION: Xaa = A, K, or E
<220> FEATURE:
<221> NAME/KEY: PEPTIDE
<222> LOCATION: (3)..(3)
<223> OTHER INFORMATION: Xaa = A, K, or E

<400> SEQUENCE: 6

Xaa Pro Xaa Pro
1

<210> SEQ ID NO 7
<211> LENGTH: 6
<212> TYPE: PRT
<213> ORGANISM: Artificial Sequence
<220> FEATURE:
<223> OTHER INFORMATION: synthetic peptide
<220> FEATURE:
<221> NAME/KEY: PEPTIDE
<222> LOCATION: (1)..(1)
<223> OTHER INFORMATION: Xaa = A, K, or E
<220> FEATURE:
<221> NAME/KEY: PEPTIDE
<222> LOCATION: (3)..(3)
<223> OTHER INFORMATION: Xaa = A, K, or E
<220> FEATURE:
<221> NAME/KEY: PEPTIDE
<222> LOCATION: (5)..(5)
<223> OTHER INFORMATION: Xaa = A, K, or E

<400> SEQUENCE: 7

Xaa Pro Xaa Pro Xaa Pro
```

```
1               5

<210> SEQ ID NO 8
<211> LENGTH: 8
<212> TYPE: PRT
<213> ORGANISM: Artificial Sequence
<220> FEATURE:
<223> OTHER INFORMATION: synthetic peptide
<220> FEATURE:
<221> NAME/KEY: PEPTIDE
<222> LOCATION: (1)..(1)
<223> OTHER INFORMATION: Xaa = A, K, or E
<220> FEATURE:
<221> NAME/KEY: PEPTIDE
<222> LOCATION: (3)..(3)
<223> OTHER INFORMATION: Xaa = A, K, or E
<220> FEATURE:
<221> NAME/KEY: PEPTIDE
<222> LOCATION: (5)..(5)
<223> OTHER INFORMATION: Xaa = A, K, or E
<220> FEATURE:
<221> NAME/KEY: PEPTIDE
<222> LOCATION: (7)..(7)
<223> OTHER INFORMATION: Xaa = A, K, or E

<400> SEQUENCE: 8

Xaa Pro Xaa Pro Xaa Pro Xaa Pro
1               5

<210> SEQ ID NO 9
<211> LENGTH: 10
<212> TYPE: PRT
<213> ORGANISM: Artificial Sequence
<220> FEATURE:
<223> OTHER INFORMATION: synthetic peptide
<220> FEATURE:
<221> NAME/KEY: PEPTIDE
<222> LOCATION: (1)..(1)
<223> OTHER INFORMATION: Xaa = A, K, or E
<220> FEATURE:
<221> NAME/KEY: PEPTIDE
<222> LOCATION: (3)..(3)
<223> OTHER INFORMATION: Xaa = A, K, or E
<220> FEATURE:
<221> NAME/KEY: PEPTIDE
<222> LOCATION: (5)..(5)
<223> OTHER INFORMATION: Xaa = A, K, or E
<220> FEATURE:
<221> NAME/KEY: PEPTIDE
<222> LOCATION: (7)..(7)
<223> OTHER INFORMATION: Xaa = A, K, or E
<220> FEATURE:
<221> NAME/KEY: PEPTIDE
<222> LOCATION: (9)..(9)
<223> OTHER INFORMATION: Xaa = A, K, or E

<400> SEQUENCE: 9

Xaa Pro Xaa Pro Xaa Pro Xaa Pro Xaa Pro
1               5                   10
```